(12) United States Patent
Poenisch et al.

(10) Patent No.: US 9,056,356 B2
(45) Date of Patent: Jun. 16, 2015

(54) DEVICE FOR MACHINING WORKPIECES

(75) Inventors: Achim Poenisch, Augustusburg (DE); Daniel Schlieder, Chemnitz (DE)

(73) Assignee: Heckert GmbH, Chemnitz (DE)

( * ) Notice: Subject to any disclaimer, the term of this patent is extended or adjusted under 35 U.S.C. 154(b) by 115 days.

(21) Appl. No.: 13/203,215

(22) PCT Filed: Feb. 24, 2010

(86) PCT No.: PCT/DE2010/075018
§ 371 (c)(1),
(2), (4) Date: Aug. 24, 2011

(87) PCT Pub. No.: WO2010/097083
PCT Pub. Date: Sep. 2, 2010

(65) Prior Publication Data
US 2011/0303059 A1   Dec. 15, 2011

(30) Foreign Application Priority Data

Feb. 25, 2009   (DE) .................. 20 2009 002 616 U

(51) Int. Cl.
*B23B 3/26*   (2006.01)
*B23B 29/034*   (2006.01)

(52) U.S. Cl.
CPC ......... *B23B 29/03439* (2013.01); *Y10T 82/125* (2015.01); *Y10T 408/8598* (2015.01); *Y10T 82/22* (2015.01); *Y10T 82/2529* (2015.01); *B23B 2270/16* (2013.01)

(58) Field of Classification Search
CPC .... B23B 41/06; B23B 51/0045; B23B 27/20; B23B 3/06; B23B 29/03453; B23B 29/03457; B23B 29/03439; B23D 77/042

USPC ............... 82/1.2, 1.4, 1.5, 113, 123, 131; 408/150, 151, 181
See application file for complete search history.

(56) References Cited

U.S. PATENT DOCUMENTS

| 2,476,255 | A |   | 7/1949 | Berthiez |        |
|-----------|---|---|--------|----------|--------|
| 3,180,187 | A | * | 4/1965 | McFerren | 82/173 |

(Continued)

FOREIGN PATENT DOCUMENTS

| DE | 2 209 031    | 10/1972 |
|----|--------------|---------|
| DE | 27 37 281 A1 | 2/1979  |

(Continued)

OTHER PUBLICATIONS

Merriam-Webster Incorporated, Merriam-Webster's Collegiate Dictionary, Tenth Edition, 1999, definition of axis found on pp. 81-82.*

(Continued)

*Primary Examiner* — Daniel Howell
*Assistant Examiner* — Nicole N Ramos
(74) *Attorney, Agent, or Firm* — Crowell & Moring LLP

(57) ABSTRACT

A device for machining workpieces, in which a surface plate (1) that can be driven about a rotational axis (W) can be moved in a linear fashion along the rotational axis (W) and the rotational axis (W) is constructed as a hollow axis (H), on the outside diameter of which the surface plate is rotatably mounted, and in which two cross slides (2, 3) which can be displaced radially to the outside and inside perpendicular to the rotational axis (W) are provided on the surface plate (1), and in which the surface plate (1) can be driven by a first drive and the cross slides (2, 3) can be driven by a common second drive.

13 Claims, 14 Drawing Sheets

(56) References Cited

U.S. PATENT DOCUMENTS

Figure 1:
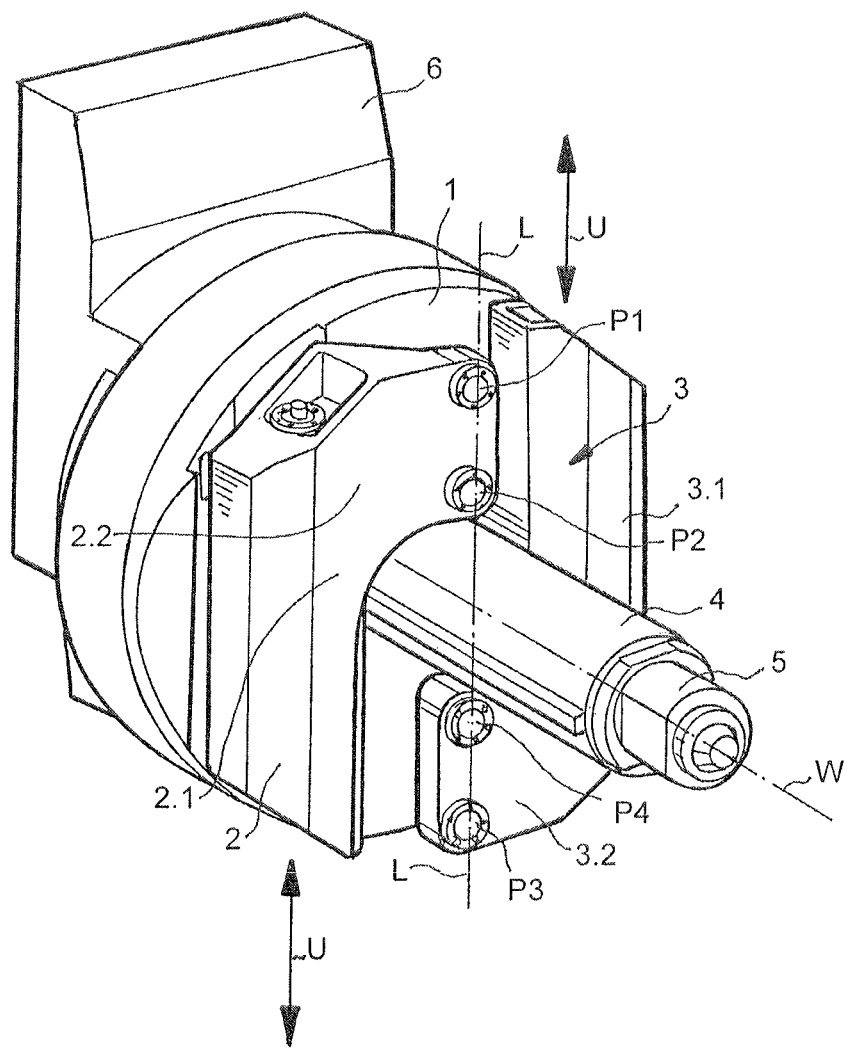

| | | | | |
|---|---|---|---|---|
| 3,246,545 | A | * | 4/1966 | Shugars .................. 82/1.2 |
| 3,748,965 | A | | 7/1973 | Galbarini et al. |
| 3,888,146 | A | * | 6/1975 | Tomenceak ............... 82/1.11 |
| 4,289,430 | A | * | 9/1981 | Shashaty .................. 408/1 R |
| 4,375,773 | A | * | 3/1983 | Liermann .................. 82/1.2 |
| 4,509,236 | A | * | 4/1985 | Morita et al. ............. 29/26 A |
| 4,791,842 | A | * | 12/1988 | Olson ...................... 82/113 |
| 4,899,628 | A | * | 2/1990 | Seichter et al. ........... 82/131 |
| 5,120,167 | A | * | 6/1992 | Simpson .................. 408/158 |
| 7,089,837 | B2 | * | 8/2006 | Feil et al. ................. 82/1.4 |
| 7,260,877 | B2 | * | 8/2007 | Broadley ................. 29/27 R |
| 2005/0204879 | A1 | | 9/2005 | Kwech et al. |

FOREIGN PATENT DOCUMENTS

| | | | |
|---|---|---|---|
| DE | 3128121 A1 | * | 2/1983 |
| DE | 39 18 118 A1 | | 12/1990 |
| DE | 3920969 A1 | * | 1/1991 |
| DE | 39 41 783 A1 | | 6/1991 |
| DE | 296 22 645 U1 | | 4/1997 |
| DE | 19717172 A1 | * | 11/1997 |
| DE | 20 2007 013 125 U1 | | 3/2009 |
| GB | 2 002 670 A | | 2/1979 |
| GB | 2 232 101 A | | 12/1990 |
| JP | 58-51008 A | | 3/1983 |
| JP | 61-56804 A | | 3/1986 |
| JP | 61056804 A | * | 3/1986 |
| JP | 03131402 A | * | 6/1991 |
| JP | 04261701 A | * | 9/1992 |
| WO | WO 9103340 A1 | * | 3/1991 |

OTHER PUBLICATIONS

Definition of "across" retrieved from the internet <URL:http://dictionary.reference.com/browse/across>, definition No. 7, p. 1, retrieved on Dec. 4, 2013.*

Corresponding International Search Report with English Translation dated Jul. 21, 2010 (six (6) pages).

* cited by examiner

DEVICE FOR MACHINING WORKPIECES

The invention relates to a device for machining workpieces, wherein a surface plate which can be driven about a rotational axis and cross slides disposed on said plate are provided.

Known from DE 39 41 783 C2 is a machine for the circular milling of round contours, which comprises a milling spindle holder or a plurality of milling spindle holders, which can be adjusted radially to the diameter of the workpiece, which can be driven by means of a gear drive and planetary cogs. In particular, two cutters are fastened to horizontal spindles. The two spindles are mounted in a slide stone which is disposed radially displaceably in radial guides, whereby the cutters can be adjusted radially to one another even during machining and it is therefore possible to also machine non-round pipes. For this purpose a non-contact scanning is provided. This solution is constructively complex. Also during circular milling the tool is guided on a helical path. In this case, positions of the path on which an axis changes its direction are problematical (quadrant transitions). As a result, the axis stops briefly and deviates from the predefined helical path with the result that high quality requirements cannot be satisfied.

GB 2 232 101 A (DE 39 18 118 A1) describes a facing head for the machining of planar surface comprising two sliders which are disposed adjacently to one another in a radial plane and during a tool adjustment are moved simultaneously and in the opposite direction to one another for balancing. The sliders are configured as two parallel connecting links (coupling) between two double-armed cranks of a parallel rank mechanism. During a tool adjustment the sliders therefore describe a part of a circular path whilst they retain their parallel position with respect to one another. The movement of the sliders is only possible to a restricted extent and depending on one another. A machining of outside and inside diameters cannot be executed with this solution.

Furthermore, known solutions have the disadvantage that no large diameter ranges can be machined.

It is the object of the invention to develop a device for machining workpieces which can be used flexibly, which has a simple constructive structure and ensures a high quality of the machined surface. This object is solved by the features of the first patent claim. Advantageous embodiments are obtained from the dependent claims.

The device for machining workpieces comprises a surface plate that can be driven about a rotational axis which can be moved in a linear fashion along the rotational axis wherein the rotational axis is designed as a hollow axis, on the outside diameter of which the surface plate is rotatably mounted, and two cross slides which can be displaced radially to the outside and inside perpendicular to the rotational axis are provided on the surface plate, wherein the surface plate can be driven by a first drive and the cross slides by a common second drive.

The drive of the cross slides and the surface plate have a relative rotational mobility with respect to one another. The surface plate can be driven by a first torque motor and the cross slides by a second torque motor, the two torque motors being disposed on a common axis. An adjustment of the cross slides can be achieved by means of a difference existing between the rotational speed of the drive of the surface plate and the rotational speed of the drive of the cross slides. The two cross slides are mounted so that they can be radially adjusted parallel and in the opposite direction to one another.

The first and/or second and/or third and/or fourth tool disposed in the cross slides are preferably fastened so that an imaginary connecting line is drawn between the first and third tool and an imaginary connecting line is drawn between the second and fourth tool through the rotational axis. The tools are therefore arranged in a perpendicular line to the axis of rotation, whereby a simple radial adjustment thereof is possible according to the diameter to be machined and an adjustment depending on an angle function can be omitted.

To this end, the two cross slides have guide regions arranged parallel to one another, wherein a bent arm extends from the guide region of the first cross slide in the direction of the second cross slide, on which arm the first and/or the second tool is/are received. Furthermore, a bent arm extends from the guide region of the second cross slide in the direction of the first cross slide, on which arm the third and/or the fourth tool is/are fastened. Preferably the first and the third tool can be fastened radially outwards and the second and the fourth tool can be fastened radially inwards.

The surface plate has a central opening in which a cross slider is accommodated with its working spindle linearly movably in the W axis. The U axes of the two cross slides in this case lie outside the rotational axis of the surface plate and outside the cross slider so that a large adjustment path is ensured.

In order to determine the diameter and/or the mid diameter of the workpiece, the device or the cross slider has a corresponding measuring device or a measuring device can be exchanged.

The device is preferably disposed vertically displaceably on a stand of a horizontal machining centre in a Y-axis, wherein the rotational axis is aligned horizontally and parallel to a Z-axis of a Z bed and is displaceable with the stand along the Z axis on the Z bed. The working spindle of the horizontal machining centre projects with its cross slider through the surface plate, wherein the axis of the working spindle lies in the W axis of the surface plate.

The surface plate and the working spindle preferably have separate drives. Furthermore, the working spindle in the cross drive is movable relative to this along the W axis. As a result, the working spindle for a milling treatment of the workpiece can be moved over the surface plate in the direction of the workpiece, the milling machining preferably taking place with a vertical surface plate.

In a preferred embodiment of the invention, the tools fastened on the first and/or second cross slide can be exchanged together with milling tools received on the working spindle by means of an automatic tool changer, with the result that tool change can be configured very effectively.

By using two cross slides arranged parallel to one another, which are adjustable outside the W axis in U axes, a very large diameter range (e.g. 400 to 2800 mm) can be machined. An adjustability of the slides during machining allows the machining of non-round contours.

With first and third tools (turning tools) arranged radially outside on the bent arms of the cross slides, outer or inner contours can be machined depending on the configuration and clamping of the tools (possibly rechucking the tools). With second and fourth tools (turning tools) arranged radially inside on the arms, machining of the outer contour is also possible and with a rechucked tool or a correspondingly configured tool, machining of the inner contour of a workpiece is possible. In addition, the device can be used for machining concentric or non-concentric plane surfaces. In this case, the tools can have correspondingly long shafts to ensure corresponding machining lengths.

In addition to the possibility of machining a large diameter range, as a result of the linear adjustability of the device along the Z axis by means of the stand, possibly in conjunction with tools having a long shaft, long inside and outside diameters can also be machined. The tool according to the invention overall provides a simple and flexibility possibility for the machining of curved outer and inner contours as well as plane surfaces in high quality.

Figure 2:
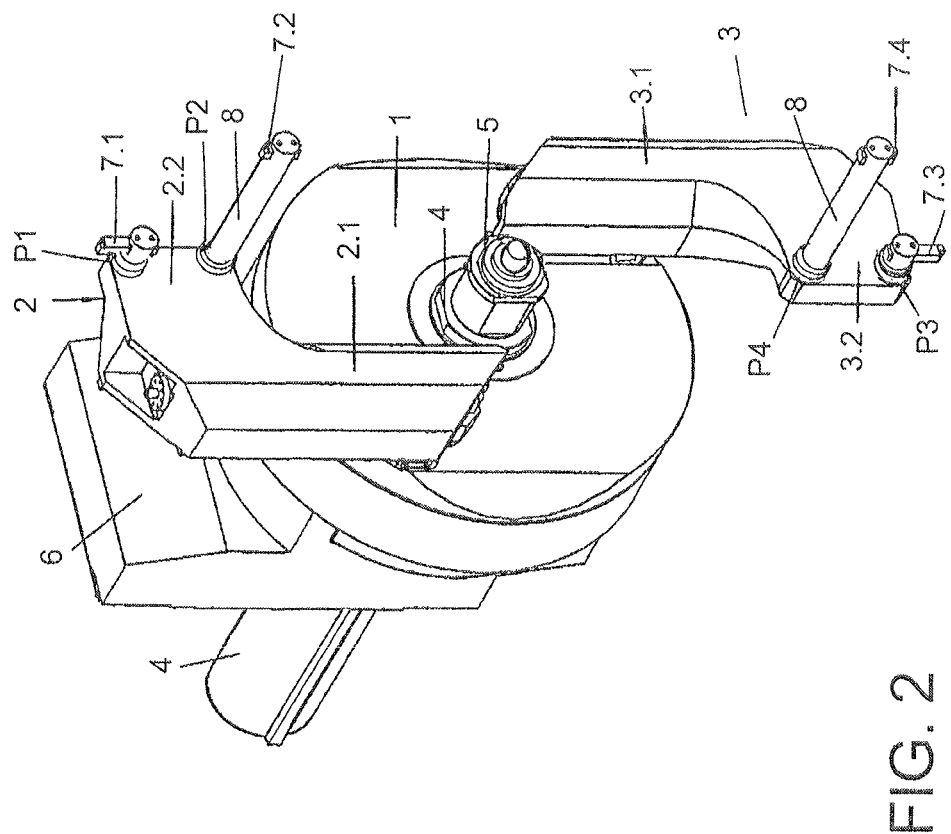
Figure 3:
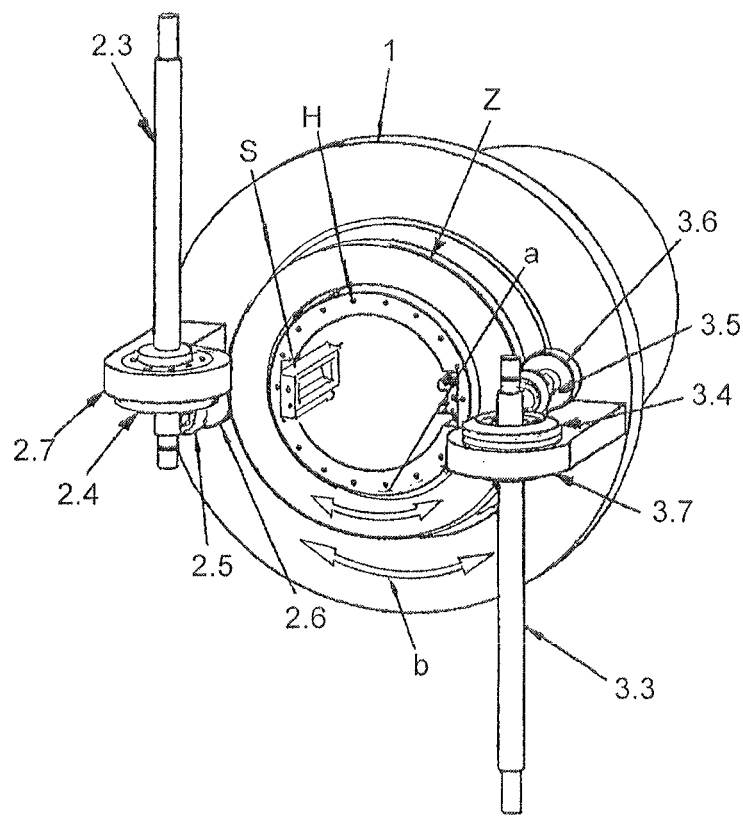
Figure 4:
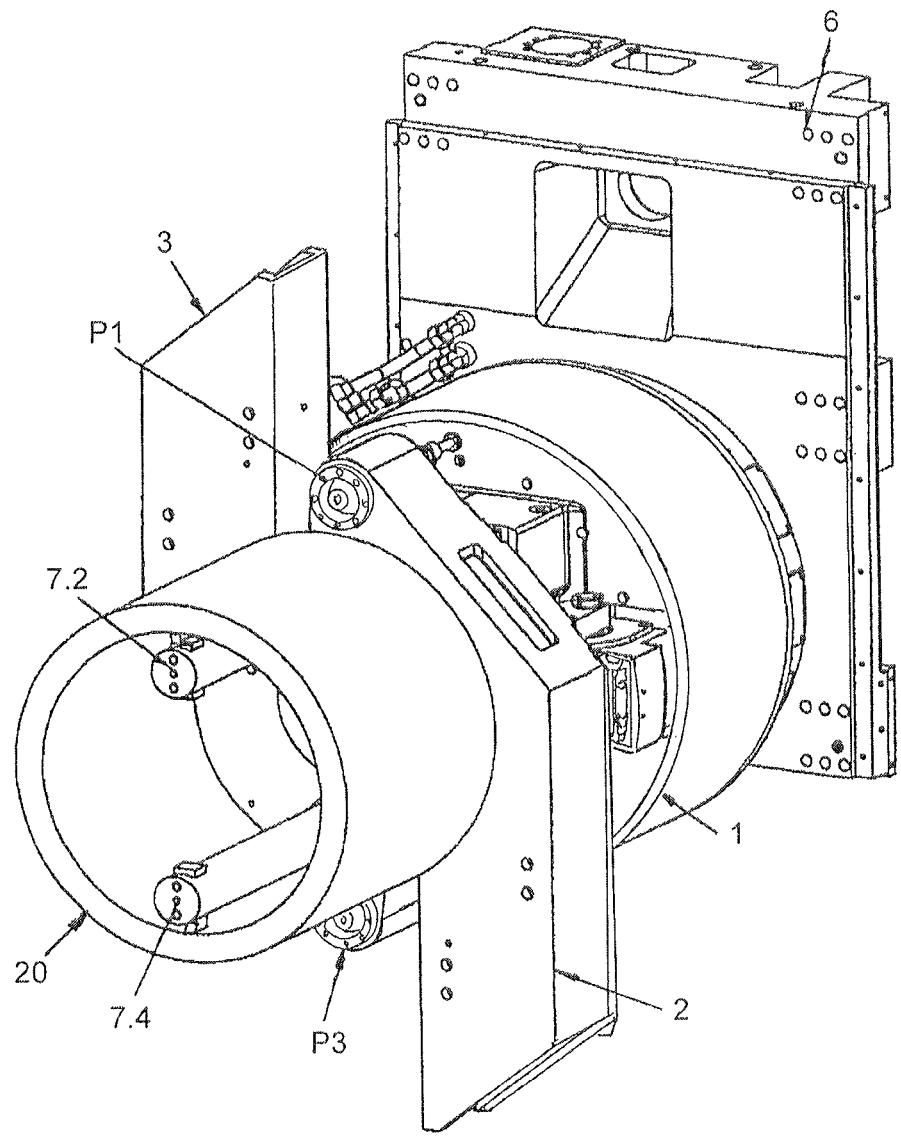
Figure 5:
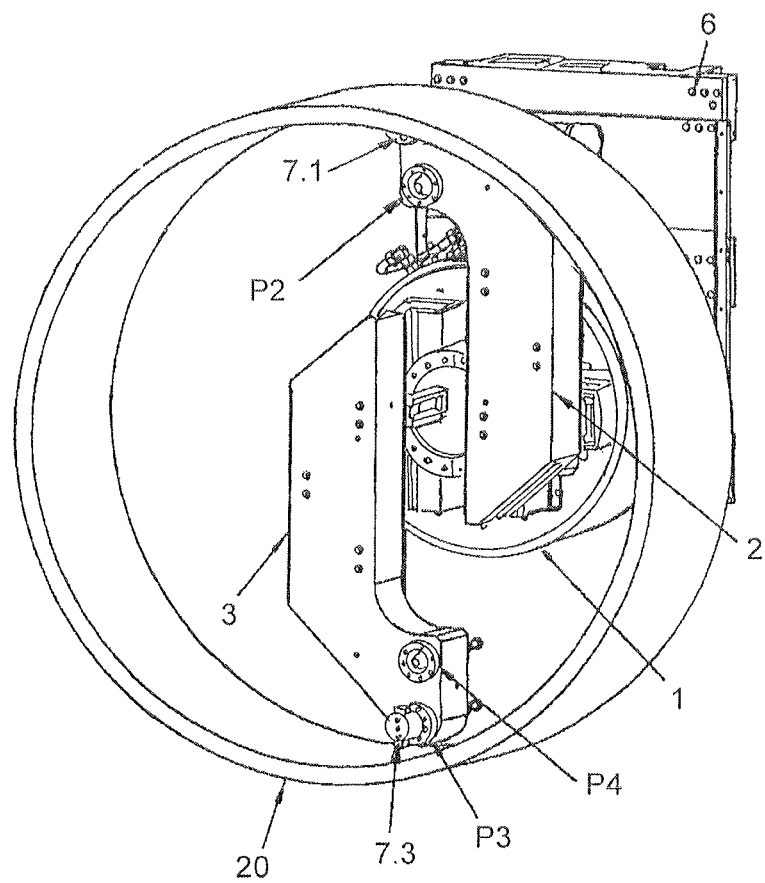
Figure 6:
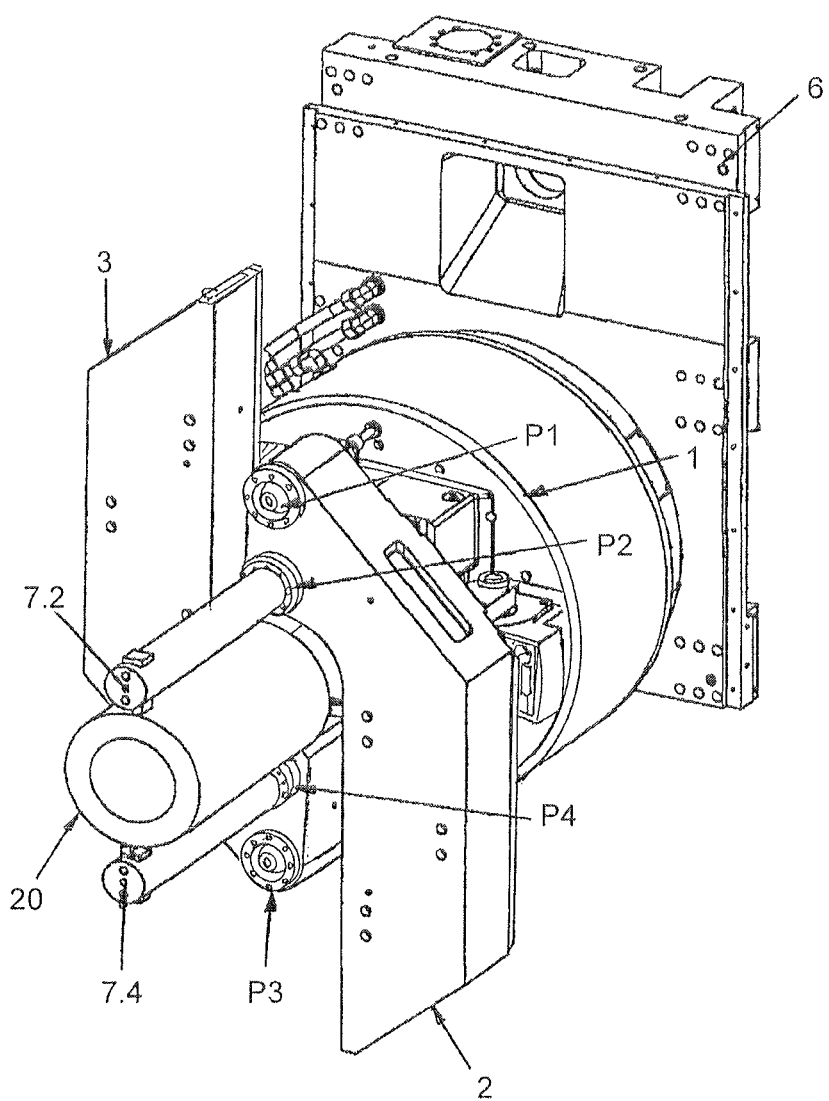
Figure 7:
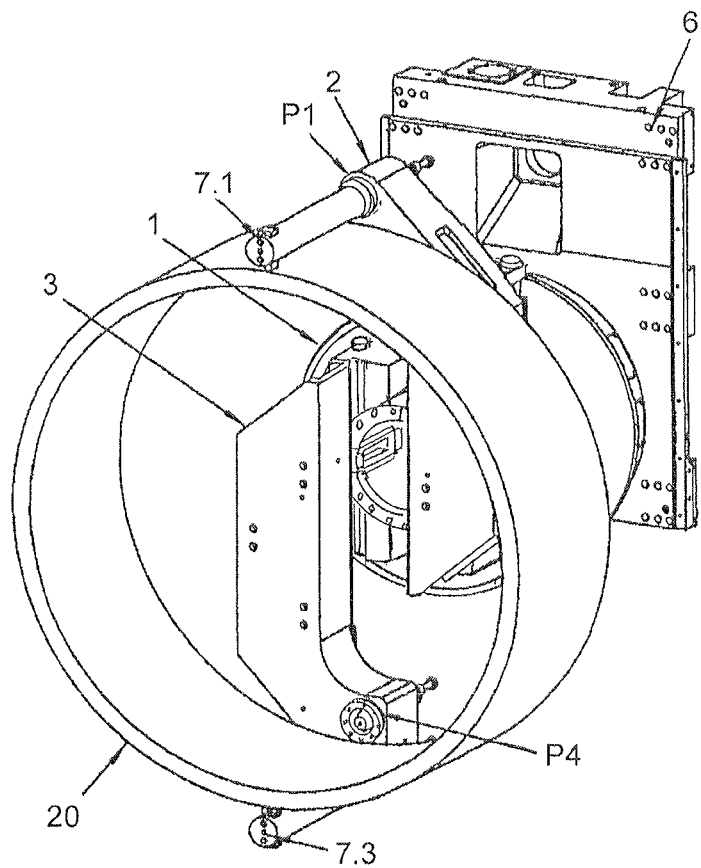
Figure 8:
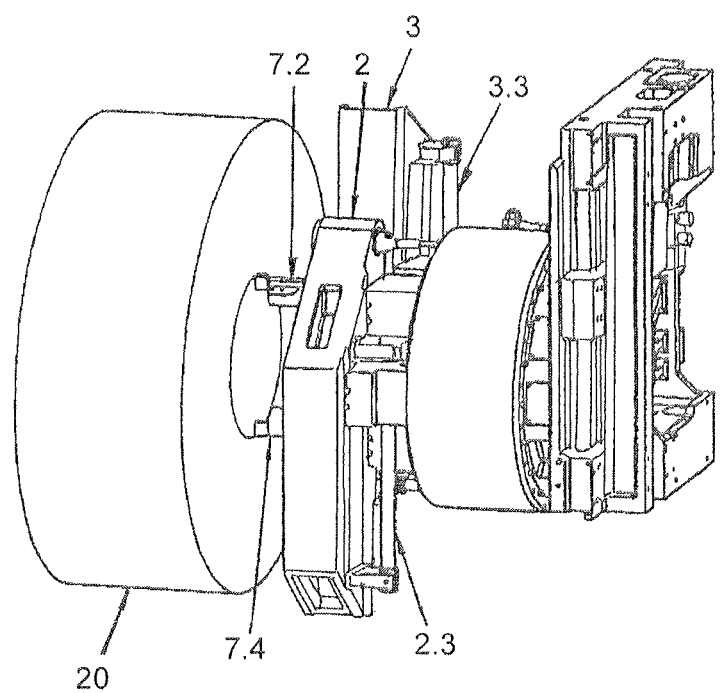
Figure 9:
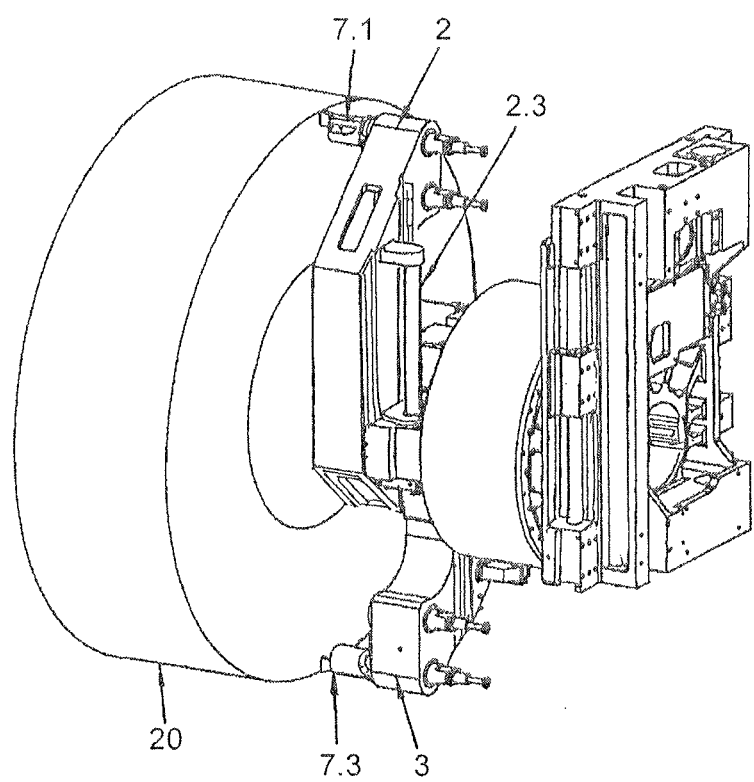
Figure 10:
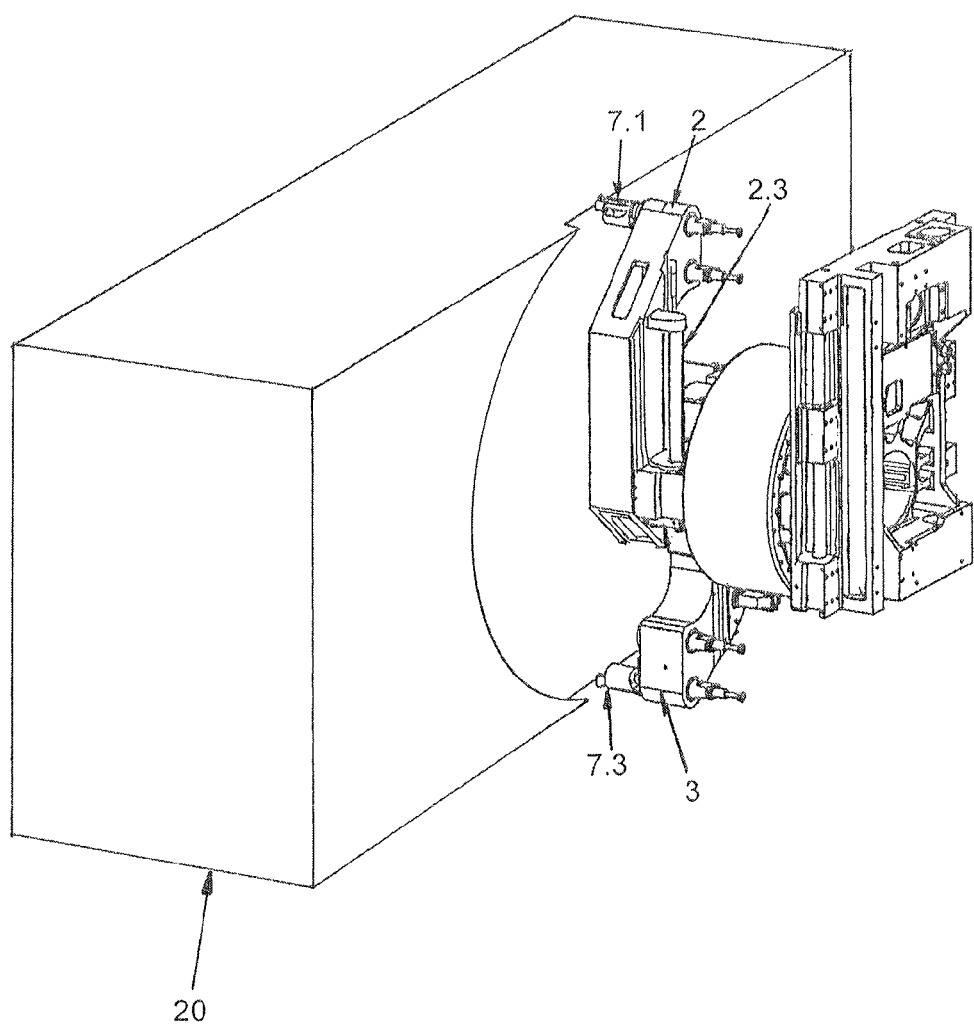
Figure 11:
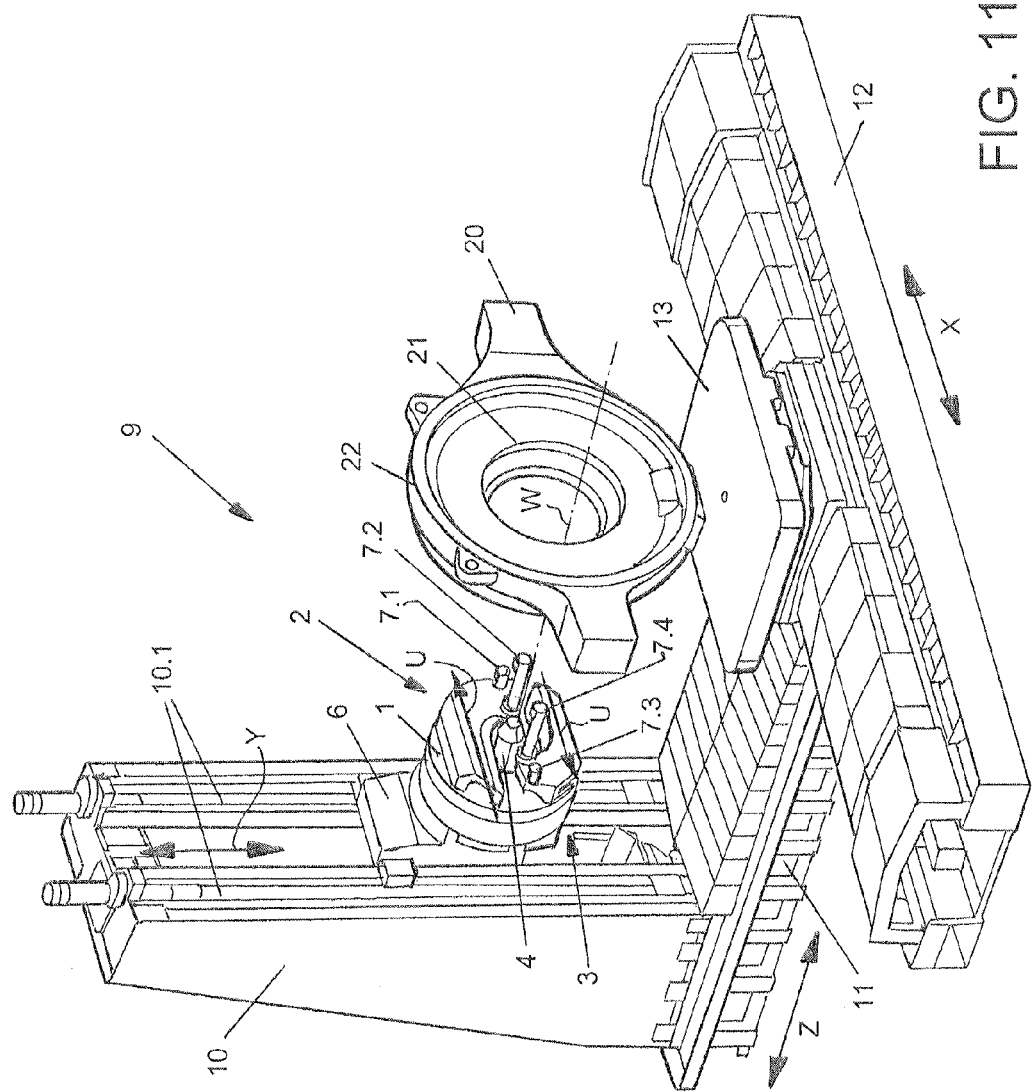
Figure 12:
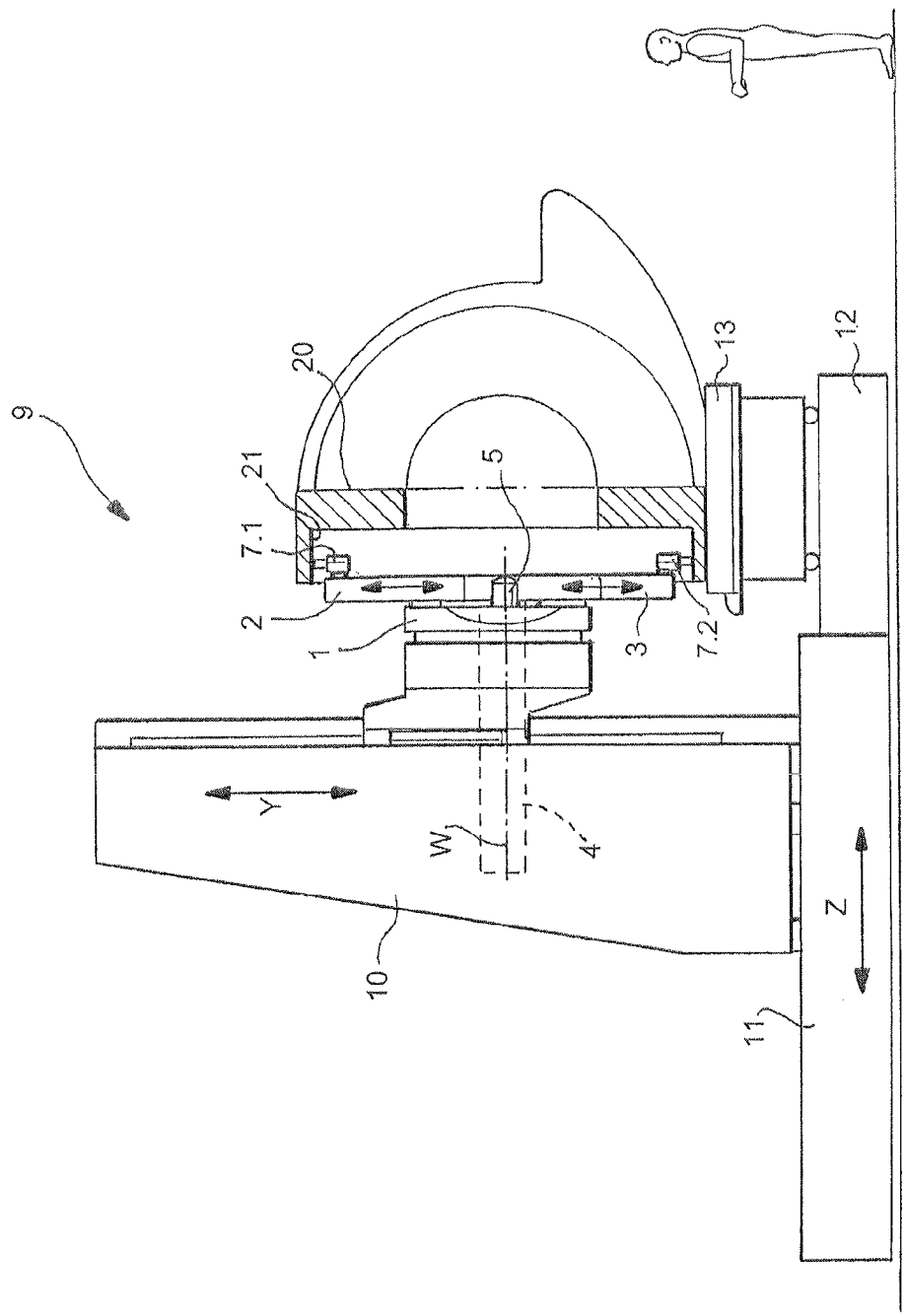
Figure 13:
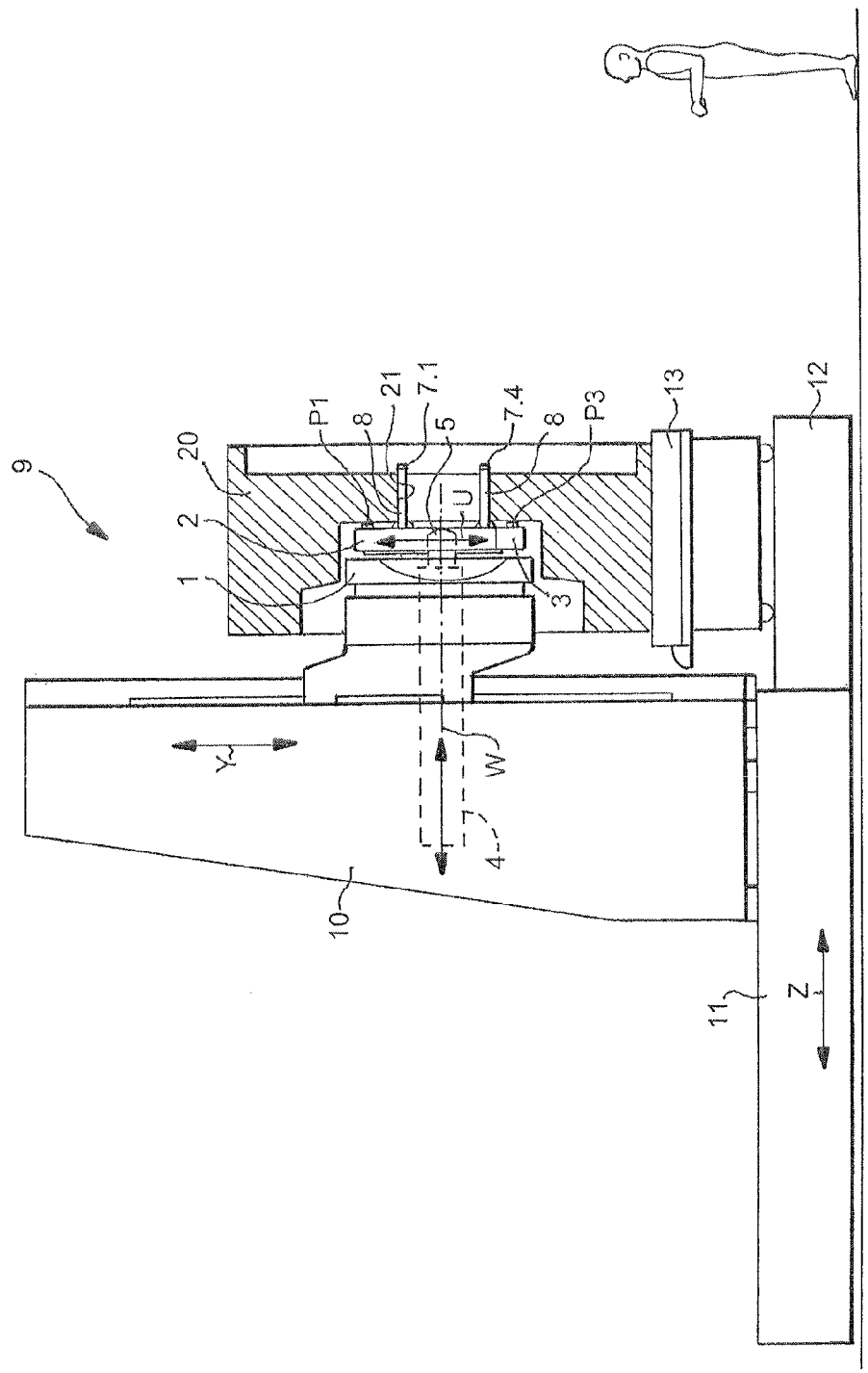
Figure 14:
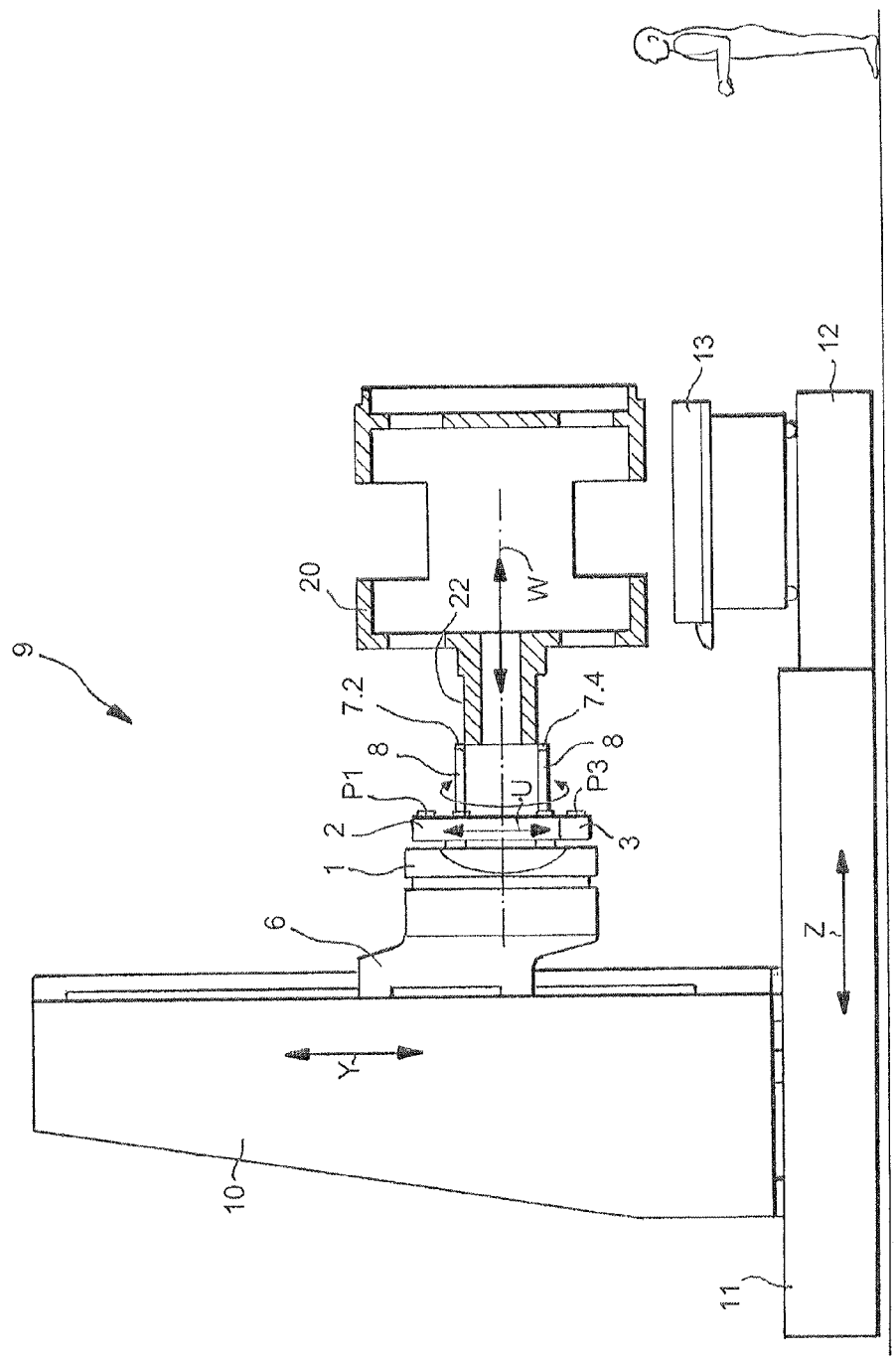

The invention is explained in detail hereinafter with reference to an exemplary embodiment and relevant drawings. In the figures:

FIG. 1 shows a three-dimensional view of a device according to the invention in the initial position with radially inward cross sliders, FIG. 2 shows a three-dimensional view of a device with cross sliders extended radially into an outer end position, FIG. 3 shows a three-dimensional view of a device without cross sliders but with driving means, FIG. 4 shows a three-dimensional view of a device during the machining of small inside diameters, FIG. 5 shows a three-dimensional view of a device during the machining of large inside diameters, FIG. 6 shows a three-dimensional view of a device during the machining of small outside diameters, FIG. 7 shows a three-dimensional view of a device during the machining of large outside diameters, FIG. 8 shows a three-dimensional view of a device during the concentric machining of small plane surfaces, FIG. 9 shows a three-dimensional view of a device during the concentric machining of large plane surfaces, FIG. 10 shows a three-dimensional view of a device during the face milling of large surfaces, FIG. 11 shows a three-dimensional view of a horizontal machining centre with a device according to the invention which is located on the stand of the horizontal machining centre, FIG. 12 shows a side view of a machining centre with a device for the machining of a large inside diameter, FIG. 13 shows a side view of a machining centre with a device for the machining of a small inside diameter, FIG. 14 shows a side view of a machining centre with a device for the machining of an outside diameter.

FIG. 1 shows a device according to the invention comprising a surface plate 1, on which a first cross slide 2 and a second cross slide 3 are arranged, which are located in a radially inwardly driven end position. The linear and mutually parallel adjustability of the cross slides 2 and 3 in longitudinal axes U is achieved by means of linear guides not shown here. The surface plate 1 is rotatable about a rotational axis W and is linearly displaceable by means of a stand (see FIG. 11) along a Z axis Z to which the rotational axis W runs parallel. The working spindle 5 of a horizontal machining centre not shown in FIG. 1 projects through the surface plate 1 and the cross slider 4. The surface plate 1 is fastened by means of a guide part 6.

The first cross slide 2 has a guide region 2.1 from which a bent arm 2.2 extends in the direction of the second cross slide 3. On the bent arm 2.2 a first tool receptacle P1 for a first tool is provided radially outside and a second tool receptacle P2 for a second tool is provided radially inside. The second cross slide 3 is mounted on the surface plate 1 by means of its guide region 3.1 as a mirror image to the first cross slide 2. The second cross slide 3 also has a bent arm 3.2 in the direction of the first cross slide 2, on which a third tool receptacle P3 for a third tool is provided radially outside and a fourth tool receptacle P4 for a fourth tool is provided radially inside. If the tool receptacles P1 to P4 are connected by means of an imaginary line L, shown dashed here, this intersects the rotational axis W. Although the longitudinal axes (U axes) U lie outside the rotational axis W, it is thereby ensured that the tools are in alignment with the rotational axis W and consequently a simple adjustment of the cross slides 2 and 3 can be made by reference to the workpiece diameter to be machined without noting angle functions.

FIG. 2 shows a three-dimensional view of the device according to FIG. 1 but with first and second cross slides 2, 3 radially extended into an outer end position. The cross slides 2, 3 were moved by means of their guide regions 2.1, 3.1 in the opposite direction to one another and parallel along axes U radially outwards so that the arms 2.2 and 3.2 project over the surface plate 1.

A first tool 7.1 for machining an inner contour is clamped in the tool receptacle P1 of the first cross slide 2 and a second tool 7.2 for machining an outer contour is clamped in the tool receptacle P2. Similarly a third tool 7.3 for machining an inside diameter is clamped on the second cross slide 3 in the third tool receptacle P3 and a fourth tool 7.4 for machining an outside diameter is clamped in the fourth tool receptacle P4. The tools 7.2 and 7.4 have a long shaft 8 to ensure a machining of the inside diameter.

FIG. 3 shows a three-dimensional view of the device according to the invention in which the cross slides 2, 3 are not shown. Instead, two threaded spindles (ball screw spindles) 2.3, 3.3, used to drive the cross slides 2, 3, are shown here, their longitudinal axes running coaxially to the longitudinal axes U of the cross slides 2, 3. The surface plate 1 is mounted rotatably on the outside diameter of the rotational axis W which is configured as a torque-proof hollow axis/hollow hub H in the guide part 6.

Furthermore a sprocket Z is provided on the outside diameter of the hollow axis/hollow hub H, which can be driven by a torque motor not shown here.

Each ball thread spindle 2.3, 3.3, arranged in a torque-proof and axially displaceable manner, has a bevel wheel 2,4, 3.4 arranged concentrically to its longitudinal axis, which is carried by a ball thread nut. A bevel pinion shaft 2.5, 3.5 is arranged orthogonally to the surface plate 1 and to the longitudinal axis of the ball thread spindle 2.3, 3.2 and acts on the bevel wheel 2.4, 3.4. A spur pinion 2.6, 3.6 is in turn mounted on the latter in a torque-proof manner and is in operative communication with the sprocket Z located on the hollow axis/hollow hub H. The rotatable ball thread nut of the bevel wheel 2.4, 3.4 has an axial-radial bearing block 2.7, 3.7 which is fastened to the surface plate 1. The surface plate 1 also has a torque motor, not shown here, as drive. Both torque motors, both that used to drive the surface plate 1 and that used to drive the cross slides 2, 3, are disposed on the guide part 6 and are preferably located on a common axis, which runs axially parallel to the rotational axis W/hollow hub B.

In addition, compact guide rails running in the axial direction are provided on the outer circumference of the cross slider 4, on which at least two compact guide shoes S fastened on the guide rail 6 are mounted.

Furthermore, the rotary movements caused by the drives of the surface plate 1 or the cross slides 2, 3 are shown in the form of double arrows a, b, where the double arrow a represents the rotary movement of the sprocket Z and the double arrow b represents the rotary movement of the surface plate 1. A torque-proof connection of the ball thread spindles 2.3, 3.3 with the surface plate 1 exists via the axial radial bearing block 2.7, 3.7 whilst a connection of the ball thread spindles 2.3, 3.3 to the sprocket Z is provided via the spur spindle 2.6, 3.6. A relative rotational mobility of surface plate 1 and sprocket Z is thereby made possible. In this case, an aligned rotary movement of the two drives takes place, where at different speeds an adjustment of the cross slides 2, 3 is accomplished via the rotating ball thread nuts and the non-rotating ball thread spindles 2.3, 3.3. A movement of the cross slides 2, 3 along the longitudinal axis U is thereby accomplished by means of the ball thread spindles 2.3, 3.3. The cross slides 2, 3 are therefore radially displaceable on the surface plate 1 and rotatable with the surface plate 1. The ball thread spindles 2.3, 3.3 used can be sealed and are therefore relatively insensitive to dirt.

FIG. 4 shows the device according to the invention during the machining of a relatively small inside diameter of the workpiece 20. In this case, the tools 7.2, 7.4 are received in the respectively radially inside second or fourth tool receptacle P2, P4 of the cross slide 2 or the cross slide 3, respectively. The fastening to a machining centre is also merely indicated here, as in the following FIGS. 5 to 10.

FIG. 5 shows the machining of a large inside diameter of the workpiece 20. Here the respectively outer tool receptacles P1, P3 of the two cross slides 2, 3 fastened to the surface plate 1 are fitted with the tools 7.1, 7.2 provided for the machining. The cross slides 2, 3 are located in their radially outer end position.

In FIG. 6 the machining of small outside diameters by the tools 7.2, 7.4 clamped in the radially inwardly arranged tool receptacles P2, P4 of the cross slides 2, 3 takes place. The long shafts 8 of the tools 7.2, 7.4 allow a machining of the outer circumference of the workpiece 20 with a relatively large axial length. The cross slides 2, 3 are located in their radially inner position.

FIG. 7 shows the machining of a large outside diameter of the workpiece 20. The tools 7.1, 7.3 located in the respectively radially outwardly arranged tool receptacles P1,P3 are again used, the tools 7.1, 7.3 also having the long shaft 8 here. The cross slides 2, 3 are located in their radially outer end position.

According to FIG. 8, the concentric machining of small plane surfaces takes place with the device according to the invention. Accordingly, the inner-lying tool receptacles P2, P4 with the tools 7.2, 7.4 are again used here. The ball thread spindles 2,3, 3.3 which are part of the drive of the cross slides 2, 3 and the cross slides 2, 3 located in their radially inner end position can be clearly seen here.

FIG. 9 in turn shows the concentric machining of large plane surfaces where the tools 7.1, 7.3 are located in the outer tool receptacles P1, P3 of the cross slides 2,3. The cross slides 2, 3 are locate radially in an outer end position, whereby the tools 7.1, 7.3 lie close to the outside diameter of the workpiece 20. The ball thread spindle 2.3 fastened on the cross slide 2 is clearly visible here.

FIG. 10 finally shows face milling using the device according to the invention. Since this involves a relatively large surface to be machined, the cross slides 2, 3 are also located in their radially outer end position here. The tools 7.1, 7.3 are clamped in the tool receptacles P1, P3.

When the drives of surface plate 1 and cross slides 2, 3 are acted upon, rotational movements of surface plate 1 and the sprocket Z in operative communication with the cross slides 2, 3 take place in the same direction of rotation. As soon as the speeds of the two drives differ, an adjusting movement of the cross slides 2, 3 takes place, i.e. a movement of the cross slides 2, 3 along the ball thread spindles 2.3, 3.3 and therefore along the longitudinal axes U. As a result of the adjustment of the cross slides 2, 3, circumferential striae are formed on the surface of the workpiece 20 which are advantageous, for example, for the sealing of flange connections. An improved surface condition can therefore be achieved with the device according to the invention during the plane surface machining.

FIG. 11 shows in three-dimensional view a horizontal machining centre 9 with a device according to the invention, which is disposed on the stand 10 of the horizontal machining centre 9, before machining.

FIG. 12 shows the horizontal machining centre 9 during machining in side view. The stand 10 is arranged so that it can move along a Z axis Z on the Z bed 11. On the stand 10, the device according to the invention is fastened by means of the guide part 6 on two linear guides 10.1 so that it is adjustable vertically in a Y axis Y. The Z bed 11 is adjoined by an X bed 12, aligned transverse thereto in an X axis, whereon an NC rotary table 13 holding a workpiece 20 is located, which workpiece is clamped on the NC rotary table 13 by means of clamping means not shown in detail.

The workpiece 20 has a bore 21 which is to be re-bored by means of the first tool 7.1 clamped on the first cross slide 2 and by means of the third tool 7.3 clamped on the second cross slide 3. To this end the stand 10 travels along the Z axis Z on the Z bed 11 in the direction of the workpiece 20 (FIG. 12). The bore 21 is measured using measurement means, not shown, in order to determine the bore centre. The surface plate 1 and/or the workpiece 20 are then aligned with respect to one another in such a manner that the rotational axis W of the surface plate 1 is aligned with the bore centre. The surface plate 1 is now set in rotation and executes an advancing movement by means of the stand 10, whereby the tools 7.1, 7.3 dip into the bore 21 and machine this (FIG. 12). Since a large diameter is to be machined here, the cross slides 2, 3 are located substantially in their outer lying end position.

The cross slider 4 is mounted in the surface plate 1 so that it is axially displaceable in the rotational axis W configured as hollow axis/hollow hub H. The working spindle 5 sits in the cross slider 4. The cross slider 4 and the working spindle 5 do not project beyond the cross slides 2, 3 in the direction of the workpiece 20. In this case, the working spindle 5 can be flange-mounted in the cross slider 4 and is linearly movable along the rotational axis W.

FIG. 13 shows a side view of the machining centre 9 according to FIG. 6 but with a device equipped for the machining of a small inside diameter, at the end of machining.

The two cross slides 2, 3 are located here substantially in their radially inner position. The outer tool receptacles P1 and P3 are free and only the inner tool receptacles P2 and P4 are fitted with a second tool 7.2 and a fourth tool 7.4, the tools 7.2, 7.4 being configured and aligned for the machining of an inside diameter.

The length of the shaft 8 of the tools 7.2, 7.4 is dimensioned so that the tools 7.2, 7.4 can machine the entire length of the bore 21 of the workpiece 20. Here the cross slider 4 and the working spindle 5 are also located in a position in which they do not project over the cross slides 2, 3.

FIG. 14 shows the side view of the machining centre 9 with a device for the machining of a relatively small outside diameter 22 of a workpiece 20. Here, as in FIG. 13, only the inner tool receptacles P2 and P4 are fitted with a second tool 7.2 and a fourth tool 7.4 but the tools 7.2, 7.4 are configured and aligned so that they ensure machining of the outside diameter 22. Here the tools 7.2, 7.4 also have a long shaft 8 so that the entire diameter length can be machined.

According to an exemplary embodiment not shown, the tool receptacles P1, P3 are equipped with tools for machining large outside diameters. Also not shown is the possibility of providing, preferably in the machining direction, firstly a roughing tool (e.g. in the form of the first or second tool) and then a finishing tool (in the form of the third or fourth tool) so that firstly a roughing and then a finishing is accomplished during a machining process and therefore a high-quality turned surface is achieved.

Due to the flexible deliverability of the cross slides 2, 3 during machining, it is also possible to machine non-round contours as well as conical outer and inner contours. In addition the relative rotational mobility of the drive of the cross slides 2, 3 and the surface plate 1 with respect to one another makes it possible to achieve an exact adjustment of the cross slides 2, 3 and therefore a higher precision during the machining of workpieces 20.

In addition, the device according to the invention also has the advantage of flexible applicability. It can be used both for the machining of outer and inner contours and also for plane surface machining.

REFERENCE LIST

1 Surface plate
2 First cross slide
2.1 Guide region of first cross slide
2.2 Arm of first cross slide
2.3 Threaded spindle
2.4 Bevel wheel
2.5 Bevel pinion shaft
2.6 Spur pinion
2.7 Axial-radial bearing block
3 Second cross slide
3.1 Guide region of second cross slide
3.2 Arm of second cross slide
3.3 Threaded spindle
3.4 Bevel wheel
3.5 Bevel pinion shaft
3.6 Spur pinion
3.7 Axial-radial bearing block
4 Cross slide
5 Working spindle
6 Guide part
7.1 First tool
7.2 Second tool
7.3 Third tool
7.4 Fourth tool
8 Shaft
9 Horizontal machining centre
10 Stand
11 Z bed
12 X bed
13 NC rotary table
20 Workpiece
21 Bore
22 Outside diameter
P1 First tool receptacle
P2 Second tool receptacle
P3 Third tool receptacle
P4 Fourth tool receptacle
H Hollow axis/hollow hub
S Compact guide shoe
Z Sprocket
L Imaginary connecting line
U U axis
W Rotational axis
X X axis
Y Y axis
Z Z axis
a Rotary movement sprocket
b Rotary movement surface plate

The invention claimed is:

1. A device for machining workpieces, comprising:
a surface plate that can be driven about a rotational axis and is also moveable in a linear fashion along said rotational axis;
first and second cross slides provided on said surface plate such that said cross slides can be displaced radially outwardly or inwardly perpendicular to said rotational axis by linear translation of said cross slides across said surface plate along slide axes that are offset from the rotational axis, said first and second cross slides being fixed in a circumferential direction of said surface plate relative to said surface plate;
a first drive for driving said surface plate;
a common second drive for driving said first and second cross slides;
a first tool and/or a second tool fastened to the first cross slide;
when the first tool is present, a third tool corresponding to the first tool fastened to the second cross slide; and
when the second tool is present, a fourth tool corresponding to the second tool fastened to the second cross slide, wherein
said surface plate is rotatably mounted concentrically on the rotational axis,
when the first tool and the third tool are fastened to the respective first and second cross slides an imaginary connecting line drawn between the first tool and the third tool passes through the rotational axis,
when the second tool and the fourth tool are fastened to the respective first and second cross slides an imaginary connecting line drawn between the second tool and the fourth tool passes through the rotational axis,
the first cross slide and the second cross slide have guide regions arranged parallel to one another, and
a first bent arm on which the first tool and/or the second tool is/are fastened extends from the guide region of the first cross slide in the direction of the second cross slide, and
a second bent arm on which the third tool and/or the fourth tool is/are fastened extends from the guide region of the second cross slide in the direction of the first cross slide.

2. The device according to claim 1, wherein said common second drive and said surface plate have a relative rotational mobility with respect to one another.

3. The device according to claim 1, wherein said surface plate is driven by a first torque motor and said first and second cross slides are driven by a second torque motor.

4. The device according to claim 3, wherein said first and second torque motors are disposed on a common axis.

5. The device according to claim 1, wherein an adjustment of the cross slides can be achieved by a difference existing between the rotational speed of the drive of the surface plate and the rotational speed of the drive of the cross slides.

6. The device according to claim 1, wherein said first and second cross slides are mounted so that they can be radially adjusted parallel and in the opposite direction to one another.

7. The device according to claim 1, further comprising a cross slider movable linearly inside the surface plate along said rotational axis.

8. The device according to claim 1, wherein:
said device is disposed vertically displaceably along a Y-axis on a stand of a horizontal machining center;
said rotational axis is aligned horizontally and parallel to a Z-axis of a Z bed and is displaceable with said stand along the Z axis on the Z bed.

9. The device according to claim 7, further comprising a working spindle of a horizontal machining center extending through said cross slider and said surface plate, wherein the axis of the working spindle lies in the rotational axis of the surface plate.

10. The device according to claim 9, wherein the surface plate and the working spindle have separate drives, and the working spindle is linearly movable along the rotational axis of the surface plate.

11. The device according to claim 9, wherein in order to carry out a milling treatment of a workpiece, the working spindle is movable over the surface plate in the direction of the workpiece.

12. The device according to claim 1, wherein said first and second cross slides are arranged on the surface plate such that the cross slides can be adjusted radially during a turning treatment.

13. The device according to claim 7, wherein said first and second cross slides are moveable along axes and are arranged on both sides of the cross slider and lie outside the rotational axis of the surface plate.

* * * * *